(12) United States Patent
Hwang

(10) Patent No.: US 8,278,848 B2
(45) Date of Patent: Oct. 2, 2012

(54) IMAGE FORMING APPARATUS AND METHOD OF CONTROLLING MOTORS THEREOF

(75) Inventor: Ho-bin Hwang, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 303 days.

(21) Appl. No.: 12/649,543

(22) Filed: Dec. 30, 2009

(65) Prior Publication Data
US 2010/0308756 A1 Dec. 9, 2010

(30) Foreign Application Priority Data
Jun. 3, 2009 (KR) .................................. 2009-49049

(51) Int. Cl.
*H02P 1/54* (2006.01)
(52) U.S. Cl. ................. 318/51; 318/34; 318/54; 318/55; 318/56; 318/57

(58) Field of Classification Search .................... 318/51, 318/34, 54–59
See application file for complete search history.

(56) References Cited

U.S. PATENT DOCUMENTS
6,281,645 B1 * 8/2001 Matsukawa .................... 318/112
6,297,610 B1 * 10/2001 Bauer et al. .................... 318/562
6,713,983 B2 * 3/2004 Maruyama .................... 318/560

* cited by examiner

*Primary Examiner* — Walter Benson
*Assistant Examiner* — David Luo
(74) *Attorney, Agent, or Firm* — Stanzione & Kim, LLP

(57) ABSTRACT

An image forming apparatus includes a plurality of motors, a controller which generates control signals to control the plurality of motors and output the control signals, and a plurality of motor drivers which control corresponding motors among the plurality of motors if the enable signal among the control signal is input, and does not control the motors although the common signal is input if the enable signal is not input. Accordingly, the image forming apparatus may control a plurality of motors which is not necessary to be driven at the same time using an enable signal and thus the motors may be effectively controlled with low expense.

27 Claims, 7 Drawing Sheets

IMAGE FORMING APPARATUS AND METHOD OF CONTROLLING MOTORS THEREOF

CROSS-REFERENCE TO RELATED APPLICATIONS

This application claims priority under 35 U.S.C. §119 from Korean Patent Application No. 2009-0049049, filed on Jun. 3, 2009, in the Korean Intellectual Property Office, the entire disclosure of which is incorporated herein by reference in its entirety.

BACKGROUND

1. Field of the General Inventive Concept

The present general inventive concept relates to an image forming apparatus and a method of controlling motors of the image forming apparatus, and more particularly, to an image forming apparatus which is capable of controlling motors mounted in the image forming apparatus using an enable signal and a method of controlling motors of the image forming apparatus.

2. Description of the Related Art

An image forming apparatus refers to an apparatus that performs generating, printing, receiving, and transmitting an image, and may be a printing machine, a scanner, a copy machine, a fax machine, and a multifunctional peripheral combining these features.

Such image forming apparatuses include motors to perform various functions, for example, transferring and supplying a printing medium. Recently, the image forming apparatus can mount option units which perform various functions, such as an auto document feeder (ADF) unit, a finisher unit, a high capacity feeder (HCF) unit, and a double capacity feeder (DCF) unit, and thus the number of motors capable of being mounted to the image forming apparatus is increased.

Accordingly, as the number of motors in an image forming apparatus increases, more control pins of a controlling element to control motors are required. Therefore, in order to reduce fabrication costs, a way to reduce the number of control pins of a controlling element to control a motor or a way to reduce the number of various elements to control a motor has been required.

SUMMARY

The present general inventive concept provides an image forming apparatus in which motors which do not need to be simultaneously driven are controlled by the same control signal using an enable signal, and a method of controlling a motor of the image forming apparatus.

Additional features and utilities of the present general inventive concept will be set forth in part in the description which follows and, in part, will be obvious from the description, or may be learned by practice of the present general inventive concept.

Embodiments of the present general inventive concept may be achieved by providing an image forming apparatus, including a plurality of motors, a controller which generates control signals to control the plurality of motors and outputs the control signals, and a plurality of motor drivers including a motor driver to control a corresponding motor among the plurality of motors if an enable signal among the control signals is input, and does not control the corresponding motor if a common signal is input if the enable signal is not input.

The controller may include a plurality of output terminals to output the control signals of the controller, and the plurality of motor drivers may include a plurality of input terminals to receive the control signals being output from the plurality of motor drivers from the output terminals.

The control signals may include an enable signal which drives each of the plurality of motor drivers and a common signal which controls a rotation direction, a rotation speed, and a rotation mode of the plurality of motors.

If the enable signal is sequentially input to each of the plurality of motor drivers, each of the plurality of motors sequentially may perform operations according to the common signal.

The enable signal may be sequentially input to each of the plurality of motor drivers according to a predetermined time interval.

The number of the plurality of output terminals may be less than the total number of the plurality of input terminals.

The plurality of output terminals may include a first output terminal which is respectively connected to each of the plurality of input terminals in order to input an enable signal to each of the plurality of motor drivers, a second output terminal which is commonly connected to the plurality of input terminals in order to control the rotation direction of the plurality of motors, a third output terminal which is commonly connected to the plurality of input terminals in order to control the rotation speed of the plurality of motors, and a fourth output terminal which is commonly connected to the plurality of input terminals in order to control the rotation mode of the plurality of motors.

The plurality of motor drivers may share at least one common signal output from the controller.

Embodiments of the present general inventive concept may also be achieved by providing generating control signals to control a plurality of motors and outputting the generated control signals, and sequentially controlling the plurality of motors according to an input of an enable signal among the output control signals.

The controlling the plurality of motors may include driving each of a plurality of motor drivers being connected to each of the plurality of motors according to an input of an enable signal among the control signals, and if the enable signal is not input, not driving the plurality of motor drivers although a common signal is commonly input to the plurality of motor drivers.

The controlling the plurality of motors may include if the enable signal is sequentially input to each of the plurality of motor drivers, each of the plurality of motors sequentially performs operations according to the common signal.

The outputting may include outputting control signals through a plurality of output terminals formed on the controller, and wherein the controlling the plurality of motors may include receiving the control signals being output from the output terminals through a plurality of input terminals formed on the plurality of motor drivers.

The control signals may include an enable signal which drives each of the plurality of motor drivers and a common signal which controls a rotation direction, a rotation speed, and a rotation mode of the plurality of motors.

The enable signal may be sequentially input to each of the plurality of motor drivers according to a predetermined time interval.

The number of the plurality of output terminals may be less than the total number of the plurality of input terminals.

The plurality of output terminals may include a first output terminal which is respectively connected to each of the plurality of input terminals in order to input an enable signal to each of the plurality of motor drivers, a second output terminal which is commonly connected to the plurality of input terminals in order to control the rotation direction of the plurality of motors, a third output terminal which is commonly connected to the plurality of input terminals in order to control the rotation speed of the plurality of motors, and a fourth output terminal which is commonly connected to the plurality of input terminals in order to control the rotation mode of the plurality of motors.

Embodiments of the present general inventive concept may also be achieved by providing a controller to control a plurality of motors to be driven, including a plurality of first output terminals which are connected to a plurality of motor drivers to drive the plurality of motors, respectively, and may include one of an enable signal and a disable signal, and at least one second output terminal which is connected to each of the plurality of motor drivers, and provides a common signal.

The controller may be applicable to an image forming apparatus, and the enable signal is sequentially output through the plurality of first output terminals to drive the plurality of motors in the order to correspond to the order of proceeding jobs performed on the image forming apparatus.

Embodiments of the present general inventive concept may also be achieved by providing a plurality of motor drivers to correspond to respective ones of the plurality of motors, and a controller to output a first control signal to at least one of the plurality of motor drivers and a second control signal to each of the plurality of motor drivers, wherein the controller controls at least one of the motors at one time to perform an operation corresponding to the second control signal.

The operation may be one of rotation direction, rotation speed, and rotation mode of the motor.

The first control signal may be sequentially input to a plurality of motor drivers at a predetermined time interval.

The first control signal may be an enabling signal and the second control signal may be a common signal.

Embodiments of the present general inventive concept may also be achieved by providing a controller having a plurality of output terminals to output control signals to control operations of a plurality of motors, at least two motor drivers having input terminals to receive the output signals of the controller and control respective ones of the plurality of motors, wherein the number of the plurality of output terminals is less than the combined number of input terminals of the at least two motor drivers.

A portion of the output signals of the controller may be simultaneously input to the input terminals of the at least two motor drivers.

A portion of output control signals may control at least one of a rotation direction, rotation speed, and rotation mode of a motor.

Embodiments of the present general inventive concept may also be achieved by providing a computer readable medium to contain computer-readable codes as a program to perform a motor controlling method of an image forming apparatus, the method including generating control signals to control a plurality of motors and outputting the generated control signals, and sequentially controlling the plurality of motors according to an input of an enable signal among the output control signals.

BRIEF DESCRIPTION OF THE DRAWINGS

These and/or other features and utilities of the present general inventive concept will become apparent and more readily appreciated from the following description of the embodiments, taken in conjunction with the accompanying drawings, of which.

DETAILED DESCRIPTION OF THE EMBODIMENTS

Figure 1:
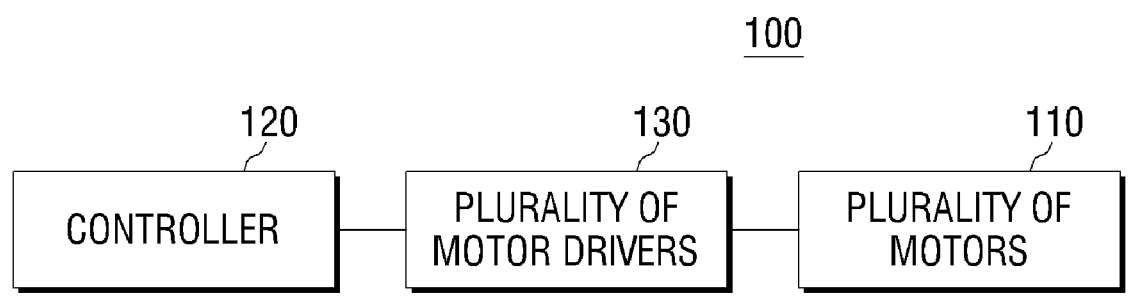
FIG. 1 is a view illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating an image forming apparatus according to an exemplary embodiment of the present general inventive concept. Referring to FIG. 1, an image forming apparatus 100 includes a plurality of motors 110, a controller 120, and a plurality of motor drivers 130.

The plurality of motors 110 may be various types of motors mounted in the image forming apparatus 100. For example, one of the plurality of motors 110 may be a stepping motor. The image forming apparatus 100 may be a scanner, a copy machine, a printing machine, or a multifunctional peripheral combining these, according to various exemplary embodiments of the present general inventive concept.

The controller 120 can generate control signals which control the plurality of motors 110 and can output a plurality of signals. For example, if a printing command is input from an application program of a user terminal (not illustrated) being connected to the image forming apparatus 100 over a wire or wirelessly, control signals of the controller 120 may be generated. The controller 120 may include a plurality of output terminals to output control signals of the controller 120. The controller 120 may be implemented using an integrated circuit (IC) chip, software or a combination thereof. In this case, the output terminals may be output ports, output pins, or other output terminals as are known in the art.

Control signals may include enable signals to drive each of the plurality of motor drivers 130 and common signals to control rotation directions, rotation speeds, and rotation modes of the plurality of motors 110. One of the enable signals may be a signal to which digital value "1" is applied, which means at least one of the plurality of motor drivers 130 is turned on for a predetermined period of time, or may be a signal to which digital value "0" is applied, which means at least one of the plurality of motor drivers 130 is turned off for a predetermined period of time.

The common signals may be signals which are commonly input to the plurality of motors 100 through the plurality of motor drivers 130. Accordingly, the rotation direction, the rotation speed, and the rotation mode of each of the plurality of motors 110 may be the same as each other, or different from each other. The rotation directions may include right, left, clockwise and counter-clockwise. The rotation speeds may be decided with reference to the number of pulse signals within a predetermined period and the rotation modes may be decided with reference to the rotation speed. That is, a rotation mode may have various rotation modes according to the reference speed such as "Full", "Half", and "Quarter".

The plurality of motor drivers 130 are connected to the plurality of motors 110, respectively, and control the plurality of motors 110 according to the output control signals of the controller 120. Specifically, if an enable signal among a plurality of control signals is input to a motor driver, one of the plurality of motor drivers 130 can control the corresponding motor among the plurality of motors 110 according to a common signal among the control signals. If an enable signal is not input, the one of the plurality of motor drivers 130 does not control the corresponding motor although the common signal may be input. The plurality of motor drivers 130 may include a plurality of input terminals to receive control signals output from output terminals of the controller 120. The plurality of motor drivers 130 may be implemented using an integrated circuit (IC) chip, software or a combination thereof. In this case, the input terminal may include input pins or other input terminals as are known in the art.

According to an exemplary embodiment of the present general inventive concept which uses an enable signal as a signal to control a motor, it is unnecessary to use an expensive controller having more control pins, that is, more input terminals or more output terminals. As a result, according to the present general inventive concept, motors which do not operate simultaneously may be efficiently controlled using an inexpensive controller which has a relatively small number of pins. According to an exemplary embodiment, as it is not necessary for the controller to include a switching element to select the plurality of motor drivers 130, the image forming apparatus may be simply implemented, and fabrication costs can be reduced.

Figure 2:
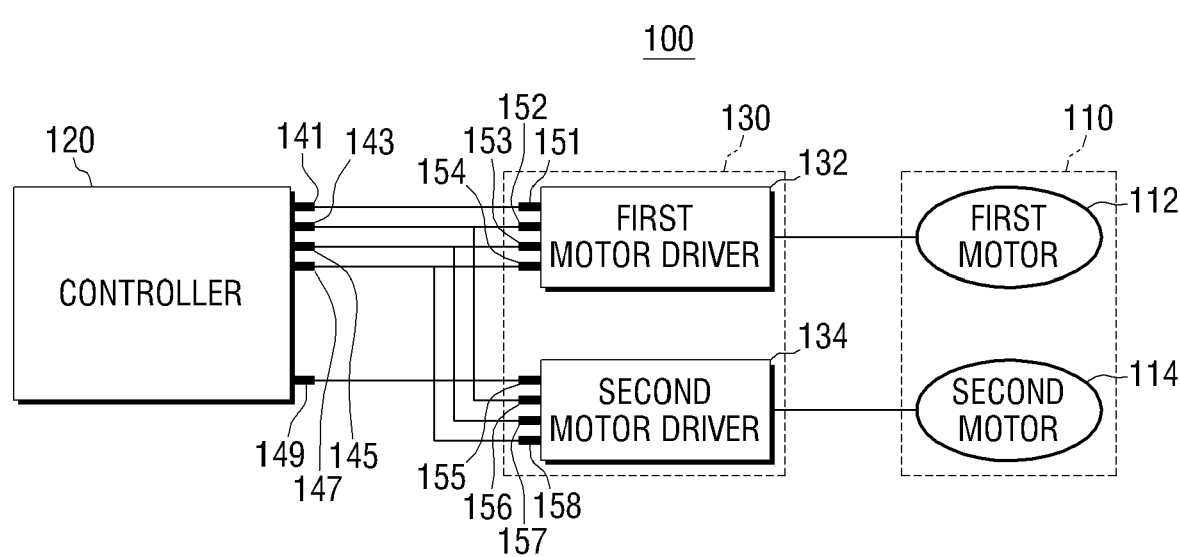
FIG. 2 is a detailed view illustrating an image forming apparatus according to an exemplary embodiment of the present general inventive concept.

FIG. 2 is a detailed view illustrating an image forming apparatus according to an exemplary embodiment of the present general inventive concept. An image forming apparatus 100 which can include two motors 112, 114 is illustrated in FIG. 2 for convenience of description. Alternatively, the image forming apparatus 100 may include three or more motors.

Referring to FIG. 2, the first motor 112 and the second motor 114 may be connected to a first motor driver 132 and a second motor driver 134, respectively. The motor drivers 132 and 134 to respectively control the first and second motors 112 and 114 may be individually included for each of the first and second motors 112, 114.

The controller 120 may include a plurality of output terminals 141, 143, 145, 147, 149, the first motor driver 132 may include a plurality of input terminals 151, 152, 153, 154, and the second motor driver 134 may include a plurality of input terminals 155, 156, 157, 158.

An enable signal may be input to the input terminal 151 of the first motor driver 130 through the output terminal 141 of the controller 120, and an enable signal may be input to the input terminal 155 of the first motor driver 130 through the output terminal 149 of the controller 120. As the first and second motors 112, 114 are not driven simultaneously, if an enable signal is input to the first motor driver 132, an enable signal is not input to the second motor driver 134. Alternatively to enable signals being input, a disable signal may be input to only the second driver 134 and not to the first motor driver 132, or to the first motor driver 132 and not to the second motor driver 134. An enable signal may be sequentially input to the first motor driver 132 and the second motor driver 134 at a predetermined time interval. An enable signal may be sequentially output through the plurality of the first output terminals 141 and 149 to drive the plurality of motors 110 in the order corresponding to the order of proceeding jobs performed on the image forming apparatus 100.

When an enable signal is applied to the first motor driver 132, if at least one of the common signals 143, 145 or 147 is input to the first motor driver 132, the first motor 112 may perform the operation corresponding to the common signal being input to the first motor driver 132. If an enable signal is input to the second motor driver 134, the second motor 114 may perform the operation corresponding to the common signal being input to the second motor driver 134.

Several types of common signals may be input to the motor drivers 130. A common signal to decide the rotation direction may be input to the input terminal 152 of the first motor driver 132 through the output terminal 143 of the controller 120. A common signal to decide the rotation speed may be input to the input terminal 153 of the first motor driver 132 through the output terminal 145 of the controller 120. A common signal to decide the rotation mode may be input to the input terminal 154 of the first motor driver 132 through the output terminal 147 of the controller 120. The common signals input to the input terminals 152, 153, 154 of the first motor driver 132 may also be input to the input terminals 156, 157, 158 of the second motor driver 134. That is, the common signal may be simultaneously input to the first and second motor drivers 132, 134.

The common signals among the control signals may be simultaneously input to both the first motor driver 132 and the second motor driver 134, and thus the number of the plurality of output terminals 141, 143, 145, 147, 149 of the controller 120 may be less than the combined number of both the plurality of the input terminals 151 to 154 of the first motor driver 132 and the plurality of the input terminals 155 to 158 of the second motor driver 134. Thus the number of control pins of the controlling element, the controller 120, can be reduced.

The plurality of output terminals of the controller 120 may be connected to the input terminals of the motor driver 130 wirelessly, through a conductive wire (not illustrated) or software.

The controller 120 to control the drive of the plurality of motors according to an exemplary embodiment of the present general inventive concept may include the plurality of first output terminals 141, 149 and at least one of the second output terminals 143, 145, 147.

The plurality of first output terminals 141, 149 are connected to the plurality of motor drivers 130 to drive the plurality of motors, respectively, and individually provide one of an enable signal and a disable signal.

At least one of the second output terminals 143, 145, 147 is connected to the plurality of the motor drivers 130, respectively, and may provide a plurality of common signals.

Herein, the controller 120 may be applied to the image forming apparatus 100, and the enable signal may be sequentially output through the first output terminals 141, 149 so that the plurality of motors are driven in the order corresponding to the order of proceeding jobs performed on the image forming apparatus 100.

Figure 3:
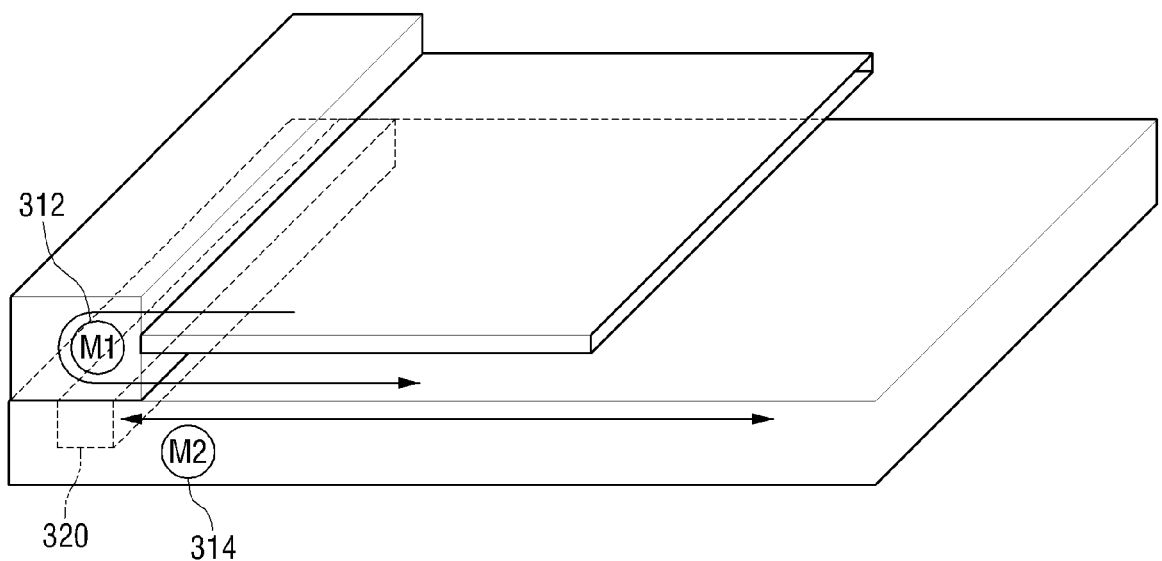
FIGS. 3 to 5 are views illustrating a method of controlling a motor of an image forming apparatus according to various exemplary embodiments of the present general inventive concept.

FIG. 3 is a view illustrating a method of controlling a motor of an image forming apparatus according to an exemplary embodiment. FIG. 3 depicts elements which relate to in a method of controlling a motor of an image forming apparatus.

According to the exemplary embodiment of FIG. 3, an image forming apparatus may be a scanner. Herein, the first motor 312 may be a motor which automatically feeds a printing medium into a tray or an automatic document feeder (ADF). The second motor 314 may be a motor which moves a scanning sensor module 320.

If the image forming apparatus performs a scanning operation, there is no possibility that the first and second motors 312, 314 can be simultaneously driven since the first motor 312 enables a printing medium to be automatically fed and then the second motor 314 enables the scanning sensor module 320 to perform the scanning operation. Accordingly, an enable signal is input to the first motor driver 132 connected to the first motor 312, and thus the first motor 312 can be driven. Then an enable signal is input to the second motor driver 134 being connected to the second motor 314, and thus the second motor 314 can be driven. In this situation, the operation of the first and second motors 312, 314 may be controlled by at least one of the common signals which can be commonly input to the first and second motor drivers (i.e.: 132 and 134).

Figure 4:
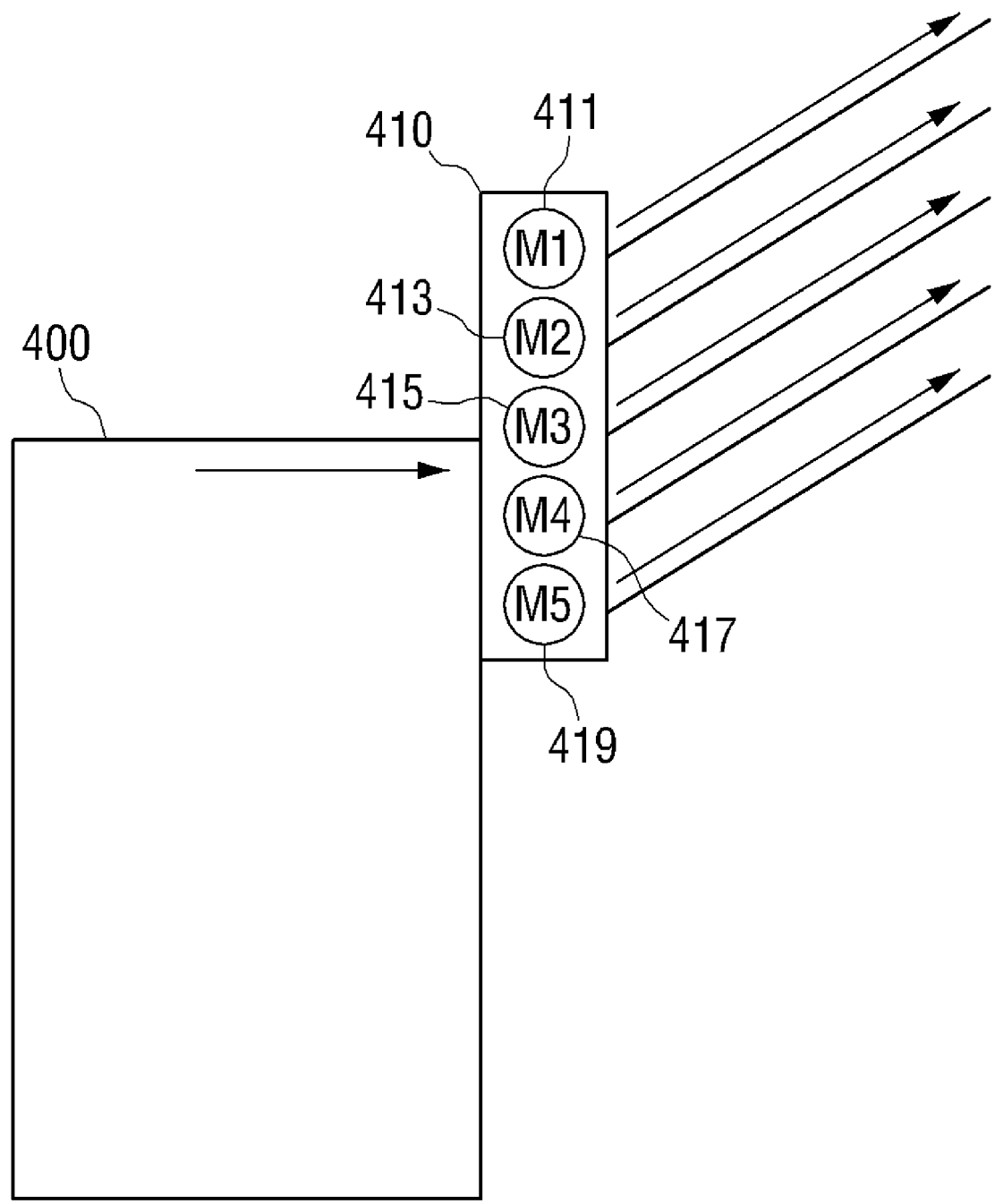
Figure 7:
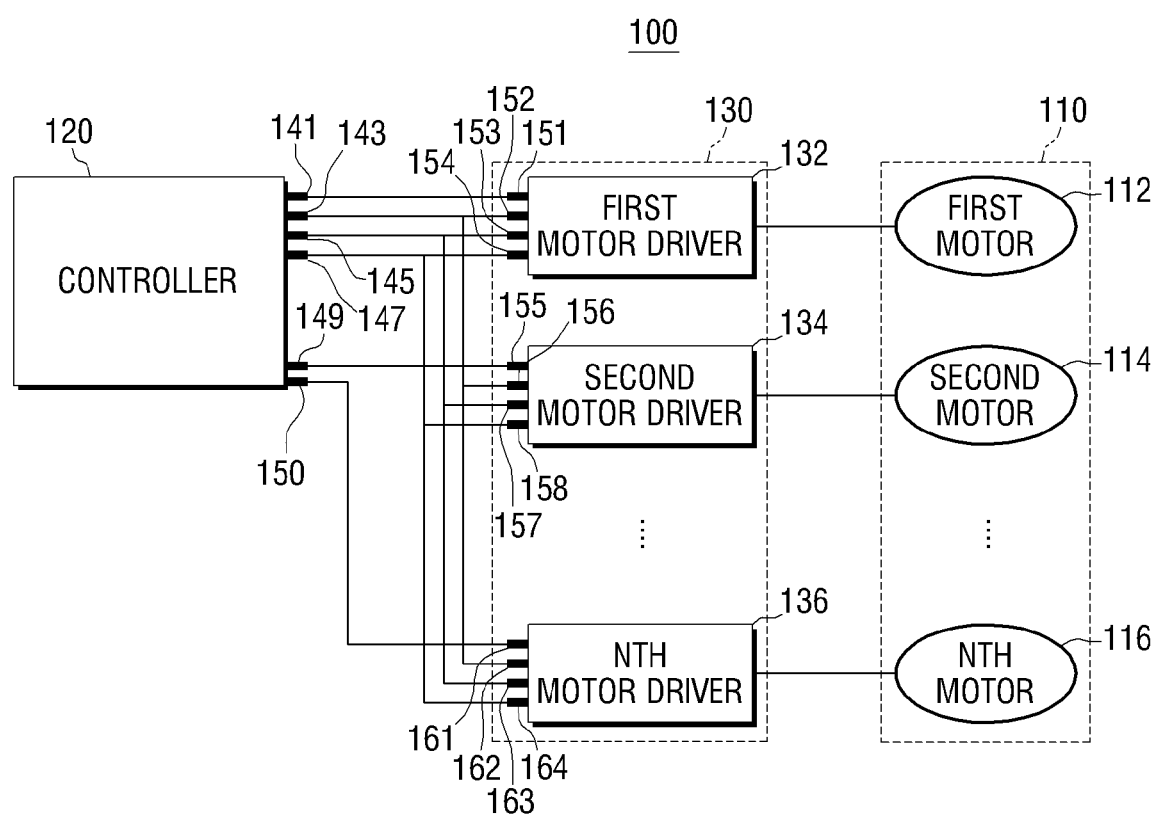
FIG. 7 is a detailed view illustrating an image forming apparatus according to an exemplary embodiment of the present general.

The method of controlling an image forming apparatus of the present general inventive concept is not limited to two motors as illustrated in FIG. 2, but may control a plurality of motors, as illustrated in FIGS. 4 and 7. In FIG. 7, the pin 150 of the controller 120 represents N number of output terminals to output N number of enabling signals, where N is a positive integer. The N enabling signals may connect to N number of motor drivers 136 and N number of motors 116. Though the number of enabling signals output from the controller 120 may be increased, the number of common signals will remain the same three signals 143, 145 and 147, to be split amongst the plurality of motor drivers 130. The Nth motor driver 136 includes input terminal 161 that represents an input terminal for N number of enabling signals, depending on the number of motor drivers used in an image forming apparatus. Similarly, the input terminals 162-164 represent input terminals for N number of common signals, depending on the N number of motor drivers used in the image forming apparatus. Using this structure and this method, one or a plurality of motors may be implemented depending on a selected number of enabling signals by the controller 120. Thus, a greater number of motors may be implemented and controlled in an image forming device while not significantly increasing the number of pins needed in a controller device.

FIG. 4 is a view illustrating a method of controlling a motor of an image forming apparatus according to another exemplary embodiment. FIG. 4 depicts elements which relate to a method of controlling a motor of an image forming apparatus.

An example of a plurality of motors being implemented in an image forming apparatus is illustrated in FIG. 4. According to the exemplary embodiment illustrated in FIG. 4, an image forming apparatus may be a printing machine, a copy machine, a scanner having a finisher, and a multifunctional peripheral combining these features.

A system to control a motor 400 may include a plurality of motor drivers. A finisher 410 may include first, second, third, fourth, and fifth motors 411, 413, 415, 417, 419.

If the image forming apparatus performs a printing operation while the number of sheets to be printed is set to be 5, an enable signal is sequentially input to the first through fifth motor drivers, and thus the first motor 411 is driven first, and then the second, third, fourth, and fifth motor drivers 413, 415, 417, 419 may be sequentially driven.

To drive the five motors M1-M5, five enabling signals may be outputted from the controller 120. The five enabling signals may be output to five different motor drivers that correspond to the motors M1-M5. Thus, the common signals output from pins 143, 145 and 147 of the controller 120 may be split into five groups and simultaneously applied to the five different motor drivers depending on which common signal is selected by the controller. The common signals received by the motor drivers may then be used to drive the five different motors M1-M5.

Figure 5:
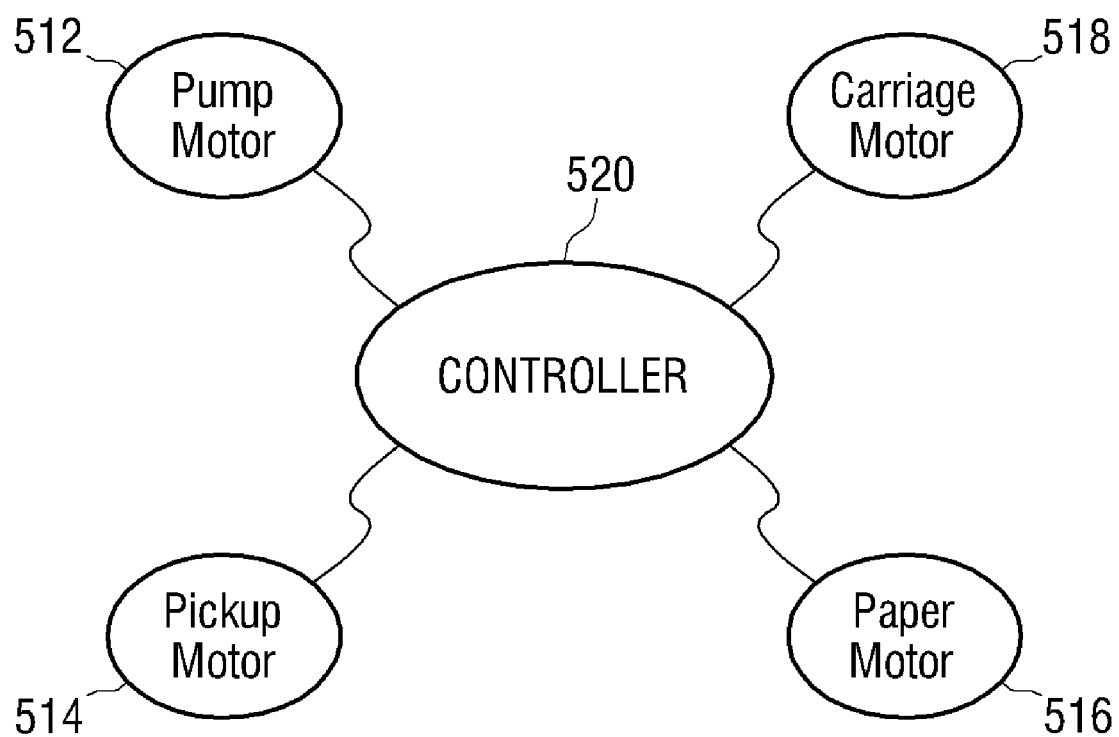

FIG. 5 is a view illustrating a method of controlling a motor of an image forming apparatus according to yet another exemplary embodiment. FIG. 5 depicts elements which are necessary to explain a method of controlling a motor of an image forming apparatus.

According to the exemplary embodiment illustrated in FIG. 5, an image forming apparatus may be an inkjet printing machine. The image forming apparatus may include a carriage motor 518 which drives a reciprocating motion of a carriage, a pick up motor 514 which picks up a printing medium, a paper motor 516 which transfers a printing medium, and a pump motor 512 which supplies ink to a carriage.

As the pump motor 514 is not driven together with the paper motor 516 or the carriage motor 518 at the same time, the first motor driver 132 may be connected to the pump motor 514 and the second motor driver 134 may be connected to the paper motor 516. Alternatively, the first motor driver 132 may be connected to the pump motor 514 and the second motor driver 134 may be connected to the carriage motor 518 and the two motors may be controlled as illustrated in FIG. 2. The method of controlling a motor by inputting an enable signal to each of the motor drivers is the same as the above-described method, and thus any overlapping explanations will be omitted.

Figure 6:
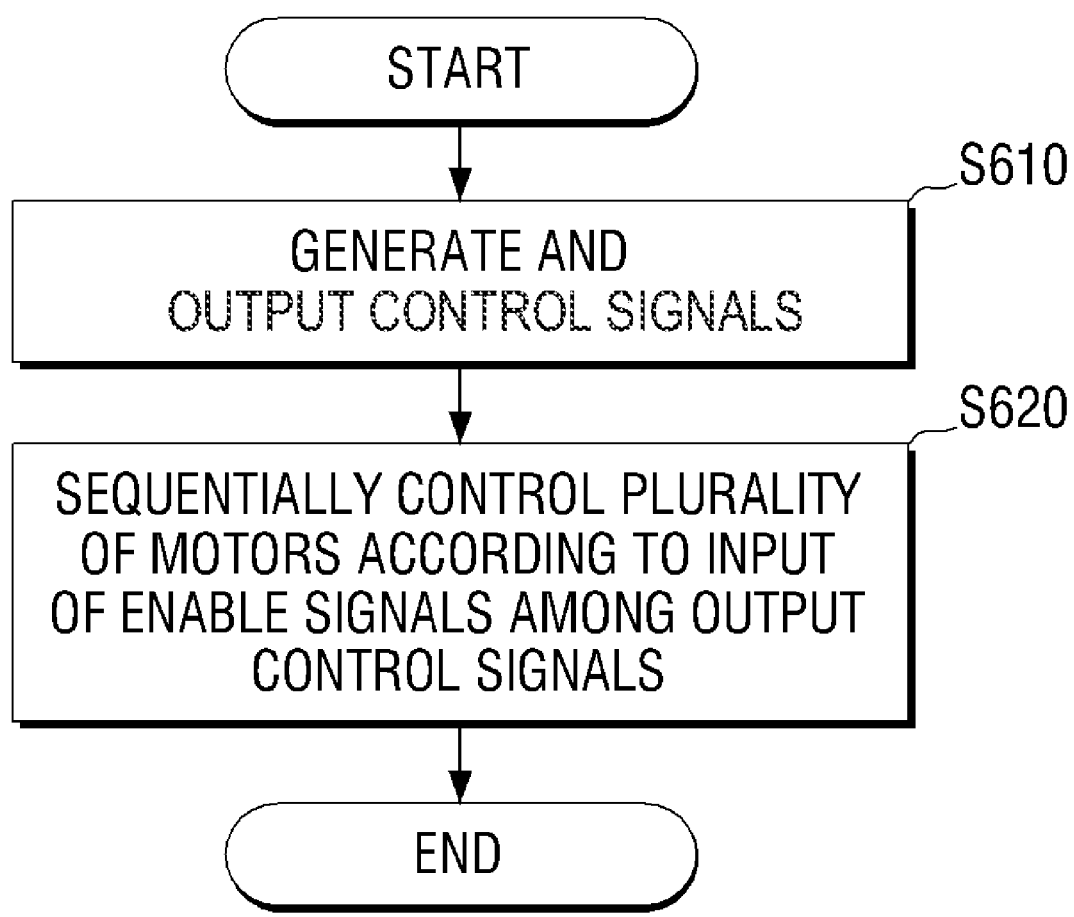
FIG. 6 is a flowchart illustrating a method of controlling a motor of an image forming apparatus according to an exemplary embodiment of the present general inventive concept.

FIG. 6 is a flowchart illustrating a method of controlling a motor of an image forming apparatus according to another exemplary embodiment. Referring to FIG. 6, according to a method of controlling a motor of an image forming apparatus, a controller generates control signals to control a plurality of motors, and outputs the generated control signals (operation S610). The controller sequentially controls the plurality of motors according to the input of enable signals among the output control signal (operation S620).

Herein, the controller respectively drives the plurality of motor drivers which are connected to the plurality of motors, respectively, according to the input of the enable signals among the control signals in operation S620. If the enable signals are not input, the controller does not drive the plurality of motor drivers although the common signal is input to the plurality of motor drivers. In operation S620, if one or more enable signals are sequentially input to each of the plurality of motor drivers, each of the plurality of motors may sequentially perform an operation according to a common signal also applied to the motor driver.

The present general inventive concept may include a computer-readable recording medium having a program to execute a method of controlling a motor of an image forming apparatus. The computer-readable recording medium may include all types of recording devices which store data capable of being read by a computer system. The computer-readable recording medium may be exemplified as a read only memory (ROM), a random access memory (RAM), a compact disk read only memory (CD-ROM), a magnetic tape, a floppy disk, an optical data storage device, and so on. The computer-readable recording medium is dispersed to the computer system connecting thereto through a network, and may store and execute a computer readable code in a dispersion method.

While the present general inventive concept has been particularly illustrated and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description provided herein, but by the appended claims, and all differences within the scope will be construed as being included in the present general inventive concept.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   a plurality of motors;
   a controller which generates control signals that comprise an enable signal to drive each of the plurality of motors and a plurality of shared common signals to each control a separate operation of the plurality of motors to control the plurality of motors and outputs the control signals; and
   a plurality of motor drivers including a motor driver to control a corresponding motor among the plurality of motors according to the plurality of shared common signals if the enable signal among the control signals is input, and does not control the corresponding motor if the enable signal is not input.

2. The image forming apparatus as claimed in claim 1, wherein the controller comprises a plurality of output terminals to output the control signals of the controller, and the plurality of motor drivers comprise a plurality of input terminals to receive the control signals being output from the plurality of motor drivers from the output terminals.

3. The image forming apparatus as claimed in claim 2, wherein the number of the plurality of output terminals is less than the total number of the plurality of input terminals.

4. The image forming apparatus as claimed in claim 2, wherein the plurality of output terminals comprise:
   a first output terminal which is respectively connected to each of the plurality of input terminals in order to input an enable signal to each of the plurality of motor drivers;
   a second output terminal which is commonly connected to the plurality of input terminals in order to control the rotation direction of the plurality of motors;
   a third output terminal which is commonly connected to the plurality of input terminals in order to control the rotation speed of the plurality of motors; and
   a fourth output terminal which is commonly connected to the plurality of input terminals in order to control the rotation mode of the plurality of motors.

5. The image forming apparatus as claimed in claim 1, wherein the common signal controls a rotation direction, a rotation speed, and a rotation mode of the plurality of motors.

6. The image forming apparatus as claimed in claim 1, wherein if the enable signal is sequentially input to each of the plurality of motor drivers, each of the plurality of motors sequentially performs operations according to the common signal.

7. The image forming apparatus as claimed in claim 1, wherein the enable signal is sequentially input to each of the plurality of motor drivers according to a predetermined time interval.

8. The image forming apparatus according to claim 1, wherein the plurality of motor drivers share at least one common signal output from the controller.

9. A method of controlling a motor of an image forming apparatus, the method comprising:
   generating control signals that comprise an enable signal to drive each of a plurality of motors and a plurality of shared common signals to each control a separate operation of the plurality of motors to control the plurality of motors and output the generated control signals; and
   sequentially controlling the plurality of motors according to an input of the enable signal among the output control signals.

10. The method as claimed in claim 9, wherein the controlling the plurality of motors comprises:
    driving each of the plurality of motor drivers being connected to each of the plurality of motors according to an input of an enable signal among the control signals; and
    if the enable signal is not input, not driving the plurality of motor drivers although a common signal is commonly input to the plurality of motor drivers.

11. The method as claimed in claim 10, wherein the controlling the plurality of motors comprises:
    if the enable signal is sequentially input to each of the plurality of motor drivers, each of the plurality of motors sequentially performs operations according to the common signal.

12. The method as claimed in claim 9, wherein the outputting comprises:
    outputting control signals through a plurality of output terminals formed on the controller, and
    wherein the controlling the plurality of motors comprises:
    receiving the control signals being output from the output terminals through a plurality of input terminals formed on the plurality of motor drivers.

13. The method as claimed in claim 12, wherein the number of the plurality of output terminals is less than the total number of the plurality of input terminals.

14. The method as claimed in claim 12, wherein the plurality of output terminals comprise:
    a first output terminal which is respectively connected to each of the plurality of input terminals in order to input an enable signal to each of the plurality of motor drivers;
    a second output terminal which is commonly connected to the plurality of input terminals in order to control the rotation direction of the plurality of motors;
    a third output terminal which is commonly connected to the plurality of input terminals in order to control the rotation speed of the plurality of motors; and
    a fourth output terminal which is commonly connected to the plurality of input terminals in order to control the rotation mode of the plurality of motors.

15. The method as claimed in claim 9, wherein the control signals comprise an enable signal which drives each of the plurality of motor drivers and a common signal which controls a rotation direction, a rotation speed, and a rotation mode of the plurality of motors.

16. The method as claimed in claim 9, wherein the enable signal is sequentially input to each of the plurality of motor drivers according to a predetermined time interval.

17. A controller to control a plurality of motors to be driven, comprising:

a plurality of first output terminals which are connected to a plurality of motor drivers to drive the plurality of motors, respectively, and including one of an enable signal and a disable signal; and a plurality of second output terminals which are connected to each of the plurality of motor drivers, and provide a plurality of shared common signals to each control a separate operation of the plurality of motors.

18. The controller as claimed in claim 17, wherein the controller is applicable to an image forming apparatus, and the enable signal is sequentially output through the plurality of first output terminals to drive the plurality of motors in the order to correspond to the order of proceeding jobs performed on the image forming apparatus.

19. An image forming apparatus including a plurality of motors, comprising:

a plurality of motor drivers to correspond to respective ones of the plurality of motors; and a controller to output a first control signal to at least one of the plurality of motor drivers and a plurality of second shared control signals to each of the plurality of motor drivers to each control a separate operation of the plurality of motors, wherein the controller controls at least one of the motors at one time to perform the operation corresponding to at least one of the second control signals.

20. The image forming apparatus of claim 19, wherein the operation is one of rotation direction, rotation speed, and rotation mode of the motor.

21. The image forming apparatus of claim 19, wherein the first control signal is sequentially input to a plurality of motor drivers at a predetermined time interval.

22. The image forming apparatus of claim 19, wherein the first control signal is an enabling signal and the second control signals are common signals.

23. An image forming apparatus, comprising:

a controller having a plurality of output terminals to output control signals to control operations of a plurality of motors;

at least two motor drivers having input terminals to receive the output control signals of the controller and control respective ones of the plurality of motors, the control signals including a plurality of shared common signals to be output to each of the at least two motor drivers to each control a separate operation of the plurality of motors, wherein the number of the plurality of output terminals is less than the combined number of input terminals of the first and second motor drivers.

24. The image forming apparatus of claim 23, wherein a portion of the output signals of the controller are simultaneously input to the input terminals of the first and second motor drivers.

25. The image forming apparatus of claim 23, wherein a portion of the output control signals control at least one of a rotation direction, rotation speed, and rotation mode of a motor.

26. A non-transitory computer readable medium to contain computer-readable codes as a program to perform a motor controlling method of an image forming apparatus, the method comprising:

generating control signals that comprise an enable signal to drive each of the plurality of motor drivers and a plurality of shared common signals to each control a separate operation of a plurality of motors to control a plurality of motors and outputting the generated control signals; and sequentially controlling the plurality of motors according to an input of an enable signal among the output control signals.

27. The image forming apparatus of claim 26, wherein a portion of the shared common signals control at least one of a rotation direction, rotation speed, and rotation mode of a motor.

* * * * *